March 24, 1959  A. R. MULLIN  2,878,633
ROTARY LAWN MOWER AND SPRAYER WITH HOLLOW SHAFT ENGINE DRIVE
Filed Oct. 11, 1956

Archie R. Mullin
INVENTOR.

BY *Clarence A. O'Brien*
*and Harvey B. Jacobson*
Attorneys

United States Patent Office 2,878,633
Patented Mar. 24, 1959

2,878,633

ROTARY LAWN MOWER AND SPRAYER WITH HOLLOW SHAFT ENGINE DRIVE

Archie R. Mullin, Neodesha, Kans.

Application October 11, 1956, Serial No. 615,369

1 Claim. (Cl. 56—25.4)

This invention relates in general to gardening tools and more particularly to lawn mowing and treating devices.

Heretofore the homeowner has utilized a lawn mower for cutting the grass with one machine and then sprayed the lawn with weed killer, fertilizer or other liquid treatments with a separate machine or by hand. In addition to this numerous attachments have been utilized on lawn mowers in an attempt to solve the problem of lawn spraying and cutting at the same time. However, often times such attachments treat areas closely adjacent to the lawn, such as flower beds in addition to the area which it is desired to treat.

Therefore, the primary object of this invention is to provide a combination power mower the blade of which cooperates with a sprayer so that a lawn may be mowed and sprayed at one and the same time.

Another object of this invention is to provide a lawn mower and sprayer having a minimum number of working parts which will not require any more power than ordinarily required for a lawn mower of a similar type.

Still another object of this invention is to provide a power driven rotary lawn mower with a spraying device which may be adjusted to a predetermined spray intensity.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
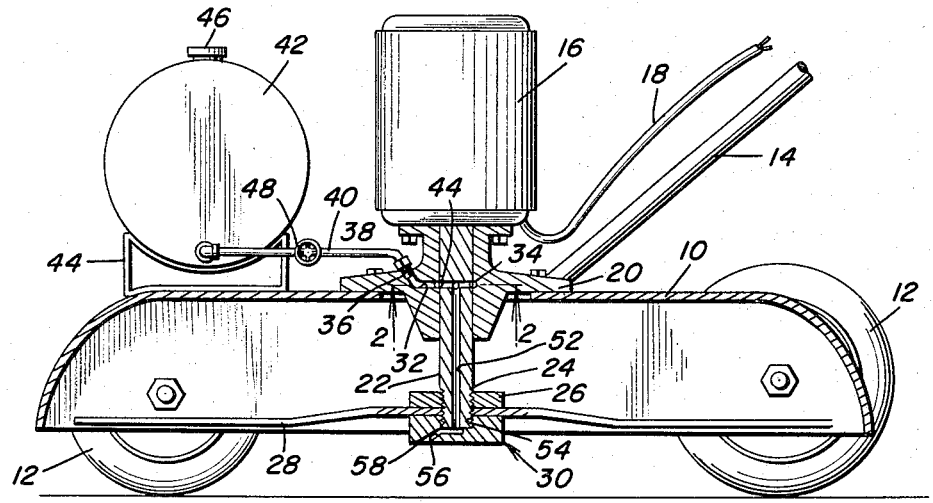
Figure 1 is a side elevation of the combination power mower and sprayer with parts of the device shown along the longitudinal center line in section for clarity.

Referring now to the drawings in detail it will be seen that the combination mower and sprayer consists of a mobile frame and which is supported by a plurality of wheels 12 and has a handle 14. As will be noted in Figure 1 the device is provided with a power source 16, which is shown as an electric motor having a feed line 18. Although shown as being powered by electricity it should be understood that a gasoline engine or other suitable source of power might be utilized. The power source is centrally located on the upper surface of the frame 10 and supported by a shaft journal 20 which serves a dual purpose of supporting the power source 16 and retaining a vertical depending power shaft 22. The lower extremity of the shaft 22 is provided with threads 24. The threaded portion 24 of the shaft 22 receives a backing nut 26, a blade 28 and a blade retaining nut, which is referred to in general by the reference numeral 30.

The shaft journal 20 is provided with a passageway 32 which is above the frame 10 and extends radially inward from the outer surface of the journal to a circumferential semi-circular groove 34 the purpose of which will be described hereinafter. The outer extremity of the passageway 32 is provided with threads 36. The threads 36 receive a threaded fitting 38 which in turn maintains a liquid supply line 40 in a fluid tight connection with the passageway 32. The liquid supply line 40 terminates in a liquid supply tank 42 which is carried on the frame 10 by a bracket 44. The supply tank 42 is provided with a filler cap 46 and the supply line 40 is provided with a control valve 48 intermediate the tank 42 and the passageway 32 for controlling the volume of liquid metered through the passageway 32.

Figure 3:
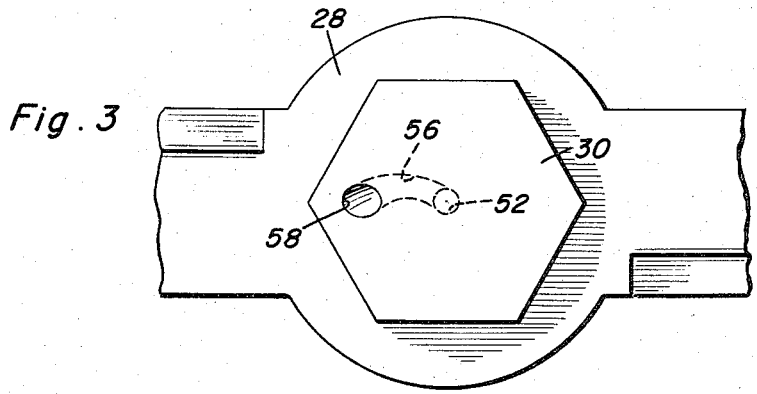
Figure 3 is an enlarged bottom view of the mower blade and mower blade retaining nut with parts of the mower blade broken away.
Figure 2:
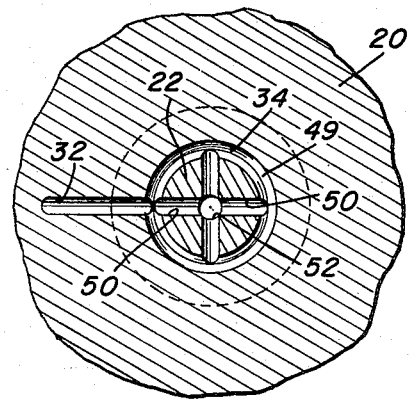
Figure 2 is an enlarged fragmentary sectional view taken substantially along the section line 2—2 of Figure 1.

The shaft 22 is provided with a circumferential groove 49 which is semi-circular in cross-section and in communication with the groove 34 in the journal 20. A plurality of inwardly extending radial bores 50 are also provided in the shaft 22. The radial bores 50 terminate in an axial bore 52 which terminates at the lower end of the shaft 22. The blade retaining nut 30 is in the form of a cap with threads 54 partway through, which are received on the threads 24 of the shaft 22. The nut 30 is provided with an orifice 56, which is in communication with the axial bore 52 of the shaft 22 and extends outwardly and downwardly from the shaft 22 and terminates in the lower surface of the nut 30 in an elliptical outlet 58. As will be noted in Figure 3 the orifice 56 is arcuate in configuration from the axial bore 52 to the outlet 58. The purpose of this arcuate configuration will be described in the operation.

In operation, the combination mower and sprayer is started, the supply tank 42 having been filled with the liquid which is to be used in treating the lawn and the valve 48 is opened to allow liquid to pass through the supply line 40 into the passageway 32 through the grooves 34 and 49 through the bores 50 and down the axial bore 52, through the orifice 56, where due to the arcuate configuration a pumping action occurs and the liquid is thrown out through the outlet 58 by means of centrifugal force in droplet form. The updraft caused by the blade 28 serves to further vaporize the liquid and spread it out in a circular pattern. The frame 10 confines the liquid to the area immediately below the mower and the amount of liquid which is allowed through the entire system is controlled by the valve 48. It should be noted that the blade retaining nut 30 serves a dual purpose, that of retaining the blade in non-rotational position with respect to the shaft 22 and that of dispensing the liquid being used for treating the lawn.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a lawn mower, a mobile frame, a shaft journal on said frame having a passageway through one side thereof adapted to receive liquid under pressure introduced therein, an upright power shaft rotatable in said journal and having a lower end depending out of the journal, said shaft having an axial bore therein extending from said end and also having a circumferential groove and radial ports therein communicating said passageway with said lower end, a horizontal mower blade on said lower end rotatable by said shaft, a blade retaining nut on said lower end beneath said blade and having an orifice therein below said blade and said lower end and extending laterally from said lower end and opening onto the bottom of the nut and whereby liquid introduced into said passageway will pass through said groove, ports and bore into and out of said orifice to discharge in spray form beneath said blade and nut by centrifugal force.

References Cited in the file of this patent

UNITED STATES PATENTS

| | | |
|---|---|---|
| 599,825 | Bidwell | Mar. 1, 1898 |
| 1,373,372 | Waite | Mar. 29, 1921 |
| 1,586,997 | Hull | June 1, 1926 |
| 1,921,901 | Anderson | Aug. 8, 1933 |
| 2,287,448 | Perkins | June 23, 1942 |
| 2,515,665 | Pieper | July 18, 1950 |
| 2,573,784 | Asbury | Nov. 6, 1951 |
| 2,721,437 | Greenlund | Oct. 25, 1955 |
| 2,740,248 | Pickens | Apr. 3, 1956 |
| 2,742,751 | Laughlin | Apr. 24, 1956 |
| 2,750,708 | Handfield | June 19, 1956 |
| 2,766,065 | Joyslen | Oct. 9, 1956 |